(12) United States Patent
Wang et al.

(10) Patent No.: US 8,111,506 B2
(45) Date of Patent: Feb. 7, 2012

(54) ELECTRONIC DEVICE

(75) Inventors: Chih-Kuang Wang, Taoyuan County (TW); Ching-Liang Chiang, Taoyuan County (TW); Ching-Shih Chen, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 387 days.

(21) Appl. No.: 12/394,055

(22) Filed: Feb. 27, 2009

(65) Prior Publication Data

US 2010/0027224 A1 Feb. 4, 2010

(30) Foreign Application Priority Data

Aug. 1, 2008 (TW) ................................ 97129299 A

(51) Int. Cl.
*G06F 1/16* (2006.01)
(52) U.S. Cl. .................. 361/679.08; 455/553.1; 16/367; 345/168
(58) Field of Classification Search ............... 455/575.3, 455/128, 575.1, 575.8, 550.1, 577, 5.8, 575.4, 455/566, 553.1; 361/679.08, 679.09, 679.31, 361/679.32, 679.33, 679.01, 679.27, 679.41, 361/679.21, 679.58, 679.43, 679.12, 679.6; 292/216; 132/294, 295; 16/348, 386, 238, 16/367, 337; 345/156, 179, 168
See application file for complete search history.

(56) References Cited

U.S. PATENT DOCUMENTS

| 5,151,946 | A | | 9/1992 | Martensson | |
|---|---|---|---|---|---|
| 6,144,554 | A | * | 11/2000 | Mok | 361/679.08 |
| 6,748,249 | B1 | | 6/2004 | Eromaki et al. | |
| 7,353,053 | B2 | | 4/2008 | Prichard et al. | |
| 2007/0054636 | A1 | * | 3/2007 | Ahn et al. | 455/128 |
| 2007/0161417 | A1 | * | 7/2007 | Kakuguchi | 455/575.3 |

OTHER PUBLICATIONS

"Office Action of Taiwan Counterpart Application", issued on Jan. 25, 2011, p1-p5, in which the listed references were cited.
"Office Action of Taiwan Counterpart Application", issued on Aug. 8, 2011, p1-p5, in which the listed reference was cited.

* cited by examiner

*Primary Examiner* — Hung Duong
(74) *Attorney, Agent, or Firm* — Jianq Chyun IP Office

(57) ABSTRACT

An electronic device including a first body, a second body, a connecting mechanism, and an input unit is provided. The second body is movably disposed on the first body. The connecting mechanism is disposed in the first body. The input unit is movably disposed on the first body, wherein the connecting mechanism connects the input unit and the second body. When the second body moves from a first position to a second position relative to the first body, the second body drives the input unit to move from a third position to a fourth position relative to the first body through the connecting mechanism.

15 Claims, 9 Drawing Sheets

ELECTRONIC DEVICE

CROSS-REFERENCE TO RELATED APPLICATION

This application claims the priority benefit of Taiwan application serial no. 97129299, filed on Aug. 1, 2008. The entirety of the above-mentioned patent application is hereby incorporated by reference herein and made a part of specification.

BACKGROUND OF THE INVENTION

1. Field of the Invention

The present invention generally relates to an electronic device, and more particularly, to an electronic device having a movable input unit.

2. Description of Related Art

Along with the development of electronic technology, the design of electronic devices has been going towards lightness, slimness, shortness, and smallness in order to allow the electronic devices to be carried around conveniently. On the other hand, a single electronic device is usually integrated with many different functions so that a user can use the electronic device to perform different tasks, such as electronic communication, text processing, and vehicle positioning, etc.

Accordingly, the input unit of an electronic device has to be designed very small in order to meet the aforementioned requirements in the appearance and function of the electronic device. For example, keys within the input unit have to be designed very small or multiple functions have to be combined into one single key. As a result, the space to be used by a designer is reduced and the operation of such an electronic device is made very inconvenient by the small keys.

FIG. 1 is a diagram of a conventional electronic device. The electronic device 100 includes a first body 110, a second body 120, and an input unit 130. The second body 120 is movably disposed on the first body 110, and the input unit 130 is fastened on the first body 110. To operate the electronic device 100, the second body 120 is slid away from the first body 110 so that the input unit 130 is exposed and accordingly the electronic device 100 can be operated. Herein, part of the second body 120 still covers the first body 110 and accordingly the input unit 130 can only be fastened on the part of the first body 110 which is not covered by second body 120. As a result, the operation area for disposing the input unit 130 is restricted.

Accordingly, how to increase the operation area of the input unit 130 without increasing the volume of the electronic device 100 is one of the major subjects in the development of electronic devices.

SUMMARY OF THE INVENTION

Accordingly, the present application is directed to an electronic device having a movable input unit, wherein the input unit offers a large operation area.

The present application provides an electronic device including a first body, a second body, a connecting mechanism, and an input unit. The second body is movably disposed on the first body. The connecting mechanism is disposed in the first body. The input unit is movably disposed on the first body, wherein the connecting mechanism connects the input unit and the second body. When the second body moves from a first position to a second position relative to the first body, the second body drives the input unit to move from a third position to a fourth position relative to the first body through the connecting mechanism.

The present application provides an electronic device including a first body, a second body, a connecting mechanism, and an input unit. The second body is pivoted on the first body. The connecting mechanism is disposed in the first body. The input unit is movably disposed on the first body, wherein the connecting mechanism connects the input unit and the first body. When the second body rotates from a first position to a second position relative to the first body, the second body drives the input unit to move from a third position to a fourth position relative to the first body through the connecting mechanism.

In the present application, an electronic device having a movable input unit is provided, wherein the input unit is extended when the electronic device is expand. Compared to the immovable keypad of a conventional electronic device, the input unit of the electronic device in the present application offers a larger operation area. Thereby, the electronic device in the present application can be operated conveniently and which offers more space for the design of the input unit thereof.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
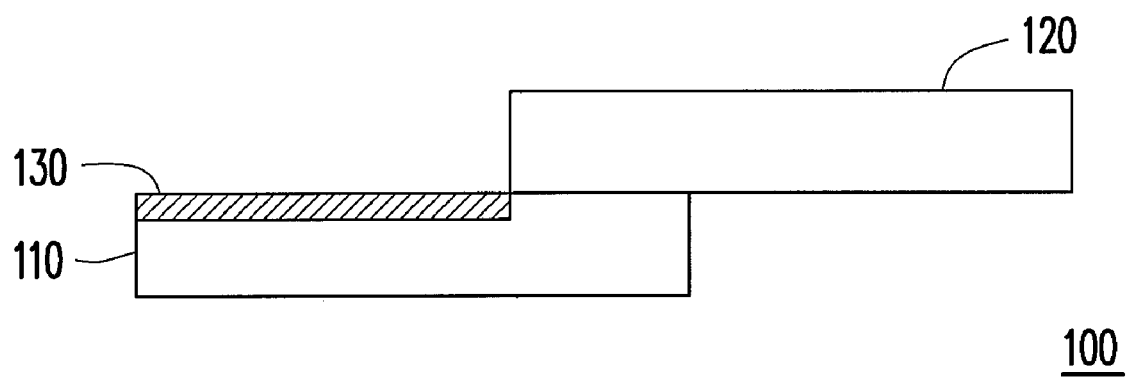
FIG. 1 is a diagram of a conventional electronic device.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
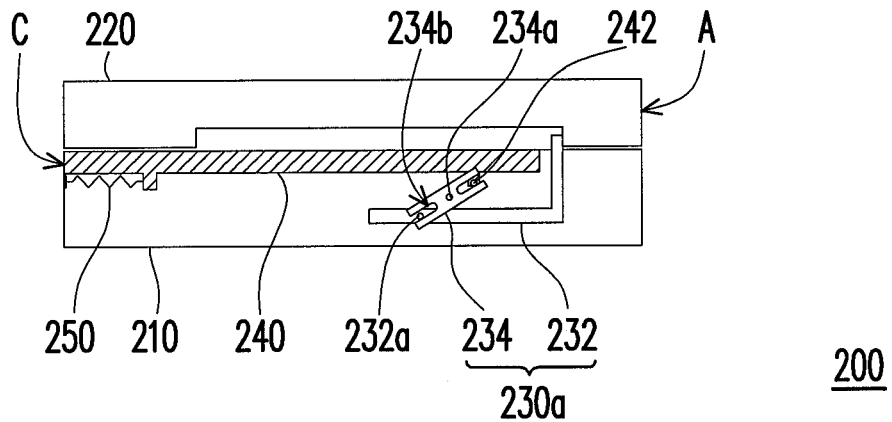
FIG. 2A is a diagram of an electronic device according to an embodiment of the present invention.

FIG. 2A is a diagram of an electronic device according to an embodiment of the present invention. Referring to FIG. 2A, the electronic device 200 includes a first body 210, a second body 220, a connecting mechanism 230a, and an input unit 240. The second body 220 is movably disposed on the first body 210. The connecting mechanism 230a is disposed in the first body 210. The input unit 240 (for example, a keypad or a keyboard) is movably disposed on the first body 210. Besides, the input unit 240 may also be a capacitive touch-sensing keyboard, a resistive touch-sensing keyboard, or a touch-sensing display which displays a keyboard on the screen. The connecting mechanism 230a connects the input unit 240 and the second body 220.

Figure 2B:
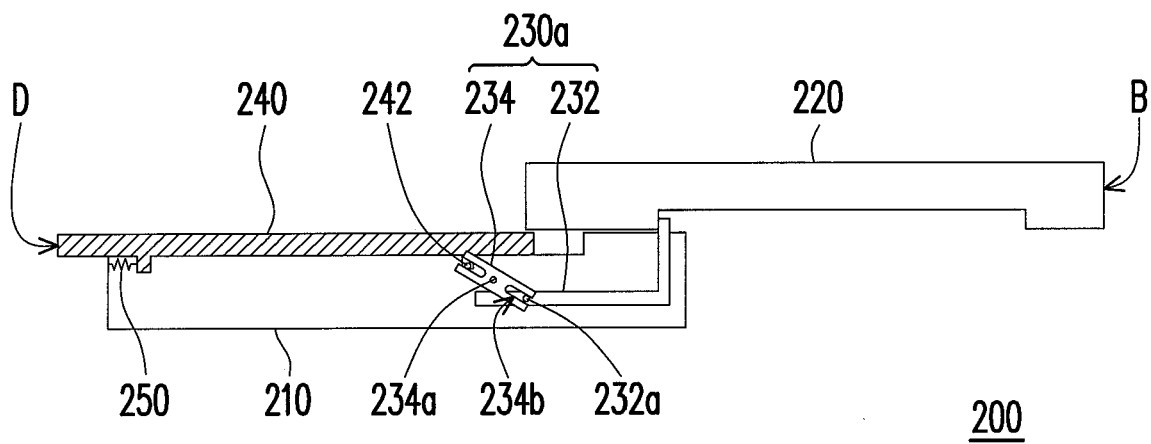
FIG. 2B is a diagram of the electronic device in FIG. 2A when the electronic device is expanded.

FIG. 2B is a diagram of the electronic device in FIG. 2A when the electronic device is expanded. Referring to both FIG. 2A and FIG. 2B, when the electronic device 200 is closed, the second body 220 is at a first position A while the input unit 240 is at a third position C, and the second body 220 covers the input unit 240. When the electronic device 200 is expanded, the second body 220 moves from the first position A to a second position B and accordingly drives the input unit 240 to move from the third position C to a fourth position D through the connecting mechanism 230a.

In the present embodiment, the movement of the second body 220 allows the input unit 240 to move towards a different direction, so that the input unit 240 can be moved from under the coverage of the second body 220 to a position at which the input unit 240 is completely exposed. Accordingly, the input unit 240 can be disposed within an area of the first body 210 which is still covered by the second body 220 when the second body 220 moves to the second position B. Since the input unit 240 moves outwards along with the movement of the second body 220, the operation area of the input unit 240 is increased.

The connecting mechanism 230a further includes a blocking portion 232 and a connecting member 234. The blocking portion 232 is movably disposed in the first body 210 and is protruded from the first body 210 towards the second body 220. The connecting member 234 is connected between the blocking portion 232 and the input unit 240. In the present embodiment, the connecting member 234 has a pivotal portion 234a and two guide grooves 234b located at two opposite sides of the pivotal portion 234a, and the blocking portion 232 and the input unit 240 respectively have a convex cylinder 232a and a convex cylinder 242 which are opposite to each other. The connecting member 234 is pivoted on the first body 210 through the pivotal portion 234a, and the convex cylinders 232a and 242 are movably disposed in the guide grooves 234b.

When the second body 220 moves from the first position A to the second position B relative to the first body 210, the second body 220 interferes with the blocking portion 232 and accordingly brings the connecting member 234 along, so that the connecting member 234 rotates around the pivotal portion 234a and accordingly drives the input unit 240 to move from the third position C to the fourth position D relative to the first body 210. Contrarily, when the electronic device 200 is closed, the second body 220 moves from the second position B back to the first position A and accordingly interferes with the blocking portion 232 and drives the input unit 240 to move from the fourth position D back to the third position C through the connecting member 234.

In the present embodiment, the electronic device 200 further includes an elastic component 250 (for example, a spring), wherein the elastic component 250 is disposed in the first body 210 and connects the input unit 240 and the first body 210. When the electronic device 200 is expanded, the input unit 240 moves from the third position C to the fourth position D so that the elastic component 250 is pressed by the input unit 240 and in a forced state. When the electronic device 200 is closed, the elastic component 250 is released and accordingly drives the input unit 240 to move from the fourth position D back to the third position C and the second body 220 to move from the second position B back to the first position A through the connecting mechanism 230a.

Figure 2C:
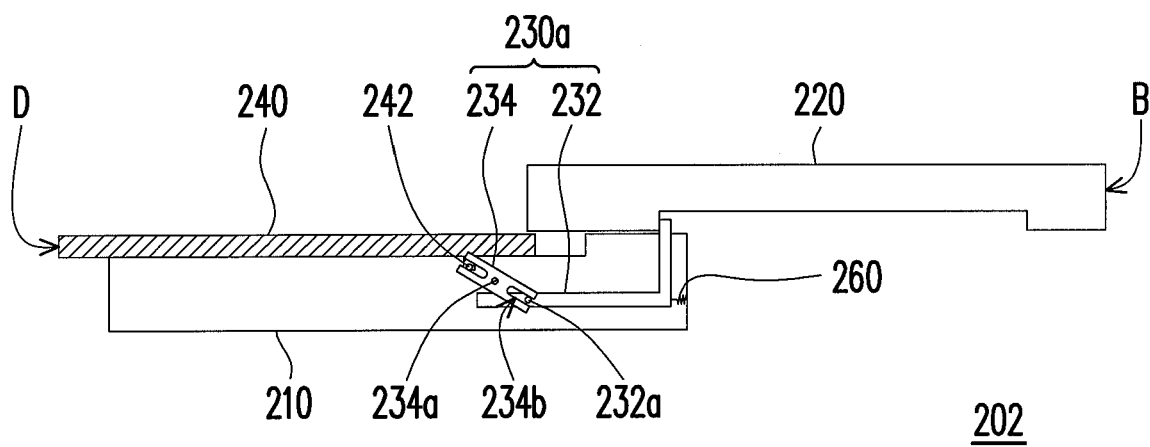
FIG. 2C is a diagram of an expanded electronic device according to another embodiment of the present invention.

FIG. 2C is a diagram of an expanded electronic device according to another embodiment of the present invention. Referring to FIG. 2C, the elastic component 260 connects the blocking portion 232 and the first body 210. When the electronic device 202 is expanded, the second body 220 moves from the first position (as the first position A in FIG. 2A) to the second position B and accordingly drives the blocking portion 232 to press the elastic component 260.

Figure 3A:
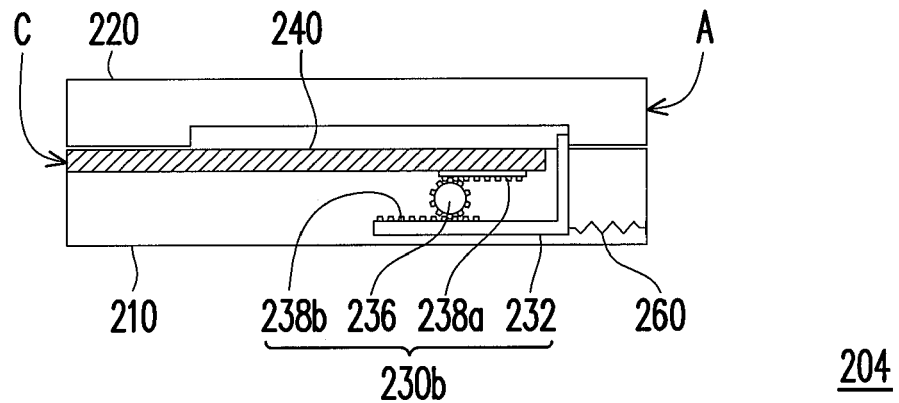
FIG. 3A is a diagram of an electronic device according to an embodiment of the present invention.
Figure 3B:
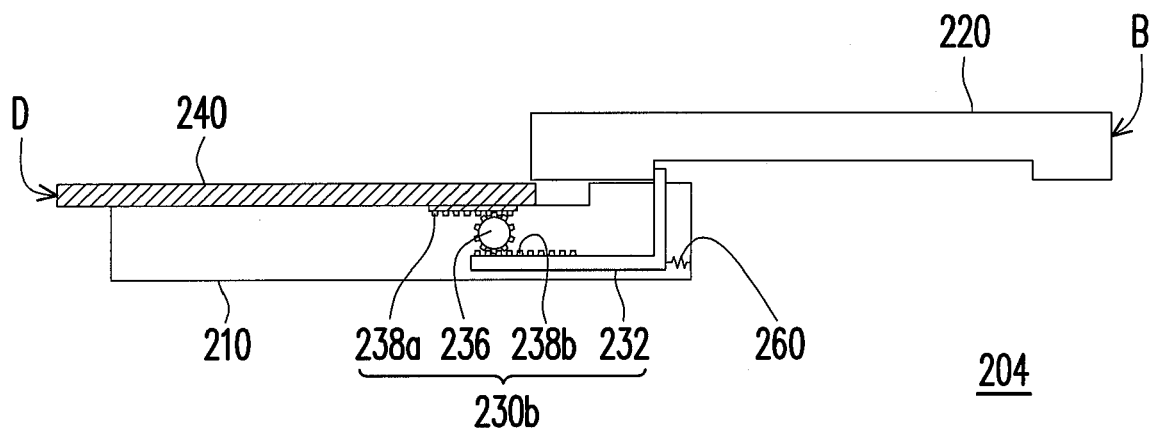
FIG. 3B is a diagram of the electronic device in FIG. 3A when the electronic device is expanded.

FIG. 3A is a diagram of an electronic device according to an embodiment of the present invention. FIG. 3B is a diagram of the electronic device in FIG. 3A when the electronic device is expanded. Referring to both FIG. 3A and FIG. 3B, the difference between the present embodiment and the embodiment described above is that in the present embodiment, the connecting mechanism 230b has a gear 236 and two racks 238a and 238b instead of the connecting member 234 as shown in FIG. 2A. The racks 238a and 238b are respectively fastened on the input unit 240 and the blocking portion 232, and the gear 236 is joggled between the two racks 238a and 238b.

When the electronic device 204 is expanded, the second body 220 moves from the first position A to the second position B and accordingly interferes with the blocking portion 232 and drives the input unit 240 to move from the third position C to the fourth position D through the gear 236 and the racks 238a and 238b. Contrarily, when the electronic device 204 is closed, the second body 220 moves from the second position B back to the first position A and accordingly brings the blocking portion 232, the racks 238a and 238b, and the gear 236 along so that the input unit 240 is driven from the fourth position D back to the third position C.

Additionally, in the present embodiment, the electronic device 204 further includes an elastic component 260 which is disposed in the first body 210 and connects the blocking portion 232 and the first body 210. When the second body 220 moves from the first position A to the second position B, the second body 220 drives the blocking portion 232 so that the elastic component 260 is pressed by the blocking portion 232 and in a forced state. Contrarily, when the electronic device 204 is closed, the elastic component 260 is released so that the blocking portion 232 is driven by the elastic component 260 and accordingly moves the second body 220 from the second position B back to the first position A. In addition, the elastic component 260 also drives the blocking portion 232 and accordingly moves the input unit 240 from the fourth position D back to the third position C through the gear 236 and the racks 238a and 238b.

Figure 3C:
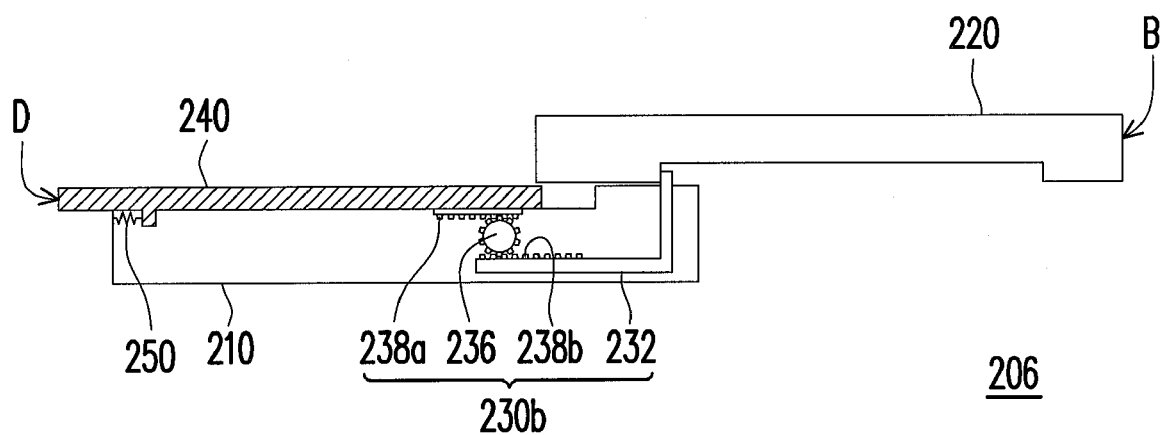
FIG. 3C is a diagram of an expanded electronic device according to another embodiment of the present invention.

FIG. 3C is a diagram of an expanded electronic device according to another embodiment of the present invention. Referring to FIG. 3C, the elastic component 250 connects the input unit 240 and the first body 210. When the electronic device 206 is expanded, the input unit 240 moves from the third position (as the first position A in FIG. 3A) to the fourth position D so that the elastic component 250 is pressed by the input unit 240 and in a forced state.

Figure 4A:
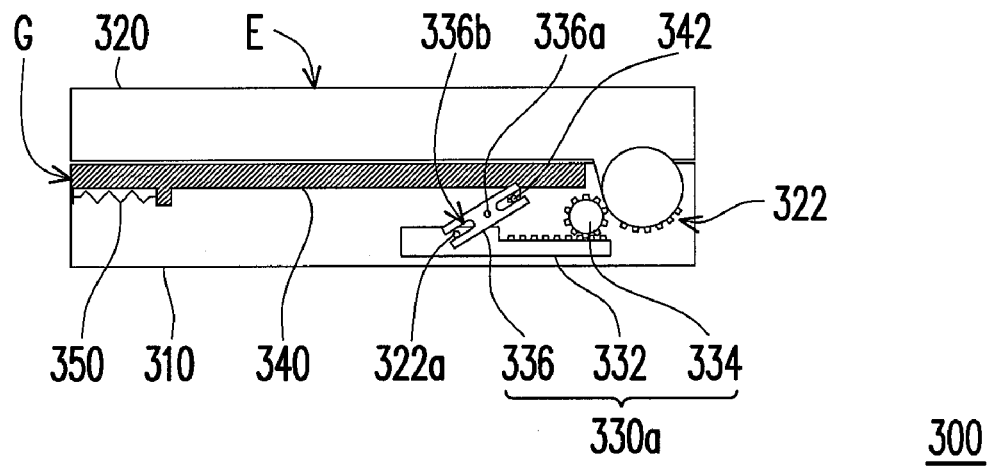
FIG. 4A is a diagram of an electronic device according to an embodiment of the present invention.

FIG. 4A is a diagram of an electronic device according to an embodiment of the present invention. Referring to FIG. 4A, the electronic device 300 includes a first body 310, a second body 320, a connecting mechanism 330a, and an input unit 340. The second body 320 is pivoted on the first body 310. The connecting mechanism 330a is disposed in the first body 310. The input unit 340 is movably disposed on the first body 310, and the connecting mechanism 330a connects the input unit 340 and the second body 320.

Figure 4B:
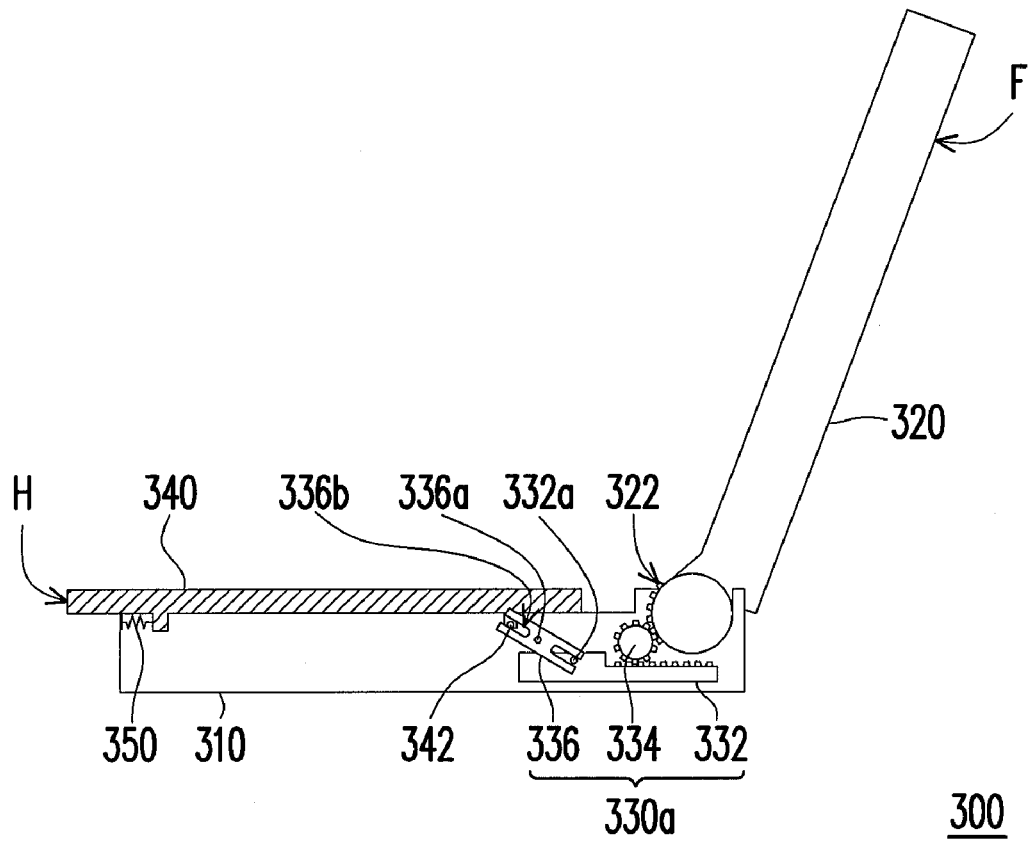
FIG. 4B is a diagram of the electronic device in FIG. 4A when the electronic device is expanded.

FIG. 4B is a diagram of the electronic device in FIG. 4A when the electronic device is expanded. Referring to both FIG. 4A and FIG. 4B, when the electronic device 300 is closed, the second body 320 is at a first position C and the input unit 340 is at a third position G, and the second body 320 covers the input unit 340. When the electronic device 300 is expanded, the second body 320 is at a second position F and the input unit 340 is at a fourth position H. In the present embodiment, the second body 320 rotates and accordingly drives the input unit 340 to move on the first body 310 so that the first body 310 can have a larger operation area and the appearance of the electronic device 300 can be made more attractive.

In the present embodiment, a gear structure 322 is disposed at where the second body 320 is connected to the connecting mechanism 330a. In addition, the connecting mechanism 330a includes a first rack 332, a first gear 334, and a connecting member 336. The first rack 332 is movably disposed in the first body 310. The first gear 332 is joggled between the gear structure 322 and the first rack 332, and the connecting member 336 is connected between the input unit 340 and the first rack 332. Moreover, the connecting member 336 further has a pivotal portion 336a and two guide grooves 336b located at two opposite sides of the pivotal portion 336a. The first rack 332 and the input unit 340 respectively have a convex cylinder 332a and a convex cylinder 342 corresponding to the guide grooves 336b. The connecting member 336 is pivoted on the first body 310 through the pivotal portion 336a, and the convex cylinders 332a and 342 are movably disposed in the guide grooves 336b.

When the second body 320 rotates from a first position E to a second position F relative to the first body 310, the second body 320 brings the connecting mechanism 330a along through the gear structure 322 and drives the input unit 340 to move from a third position G to a fourth position H through the first gear 334, the first rack 332, and the connecting member 336. When the second body 320 rotates from the second position F back to the first position E, the second body 320 brings the connecting mechanism 330a along through the gear structure 322 and accordingly drives the input unit 340 to move from the fourth position H back to the third position G.

In the present embodiment, the electronic device 300 further includes an elastic component 350 which is disposed in the first body 310 and connects the input unit 340 and the first body 310. When the electronic device 300 is expanded so that the input unit 340 moves from the third position G to the fourth position H, the elastic component 350 is pressed and in a forced state. Contrarily, when the elastic component 350 is released from the pressed state, it drives the input unit 340 to move from the fourth position H back to the third position G and moves the second body 320 from the second position F back to the first position E through the connecting mechanism 330a.

Figure 4C:
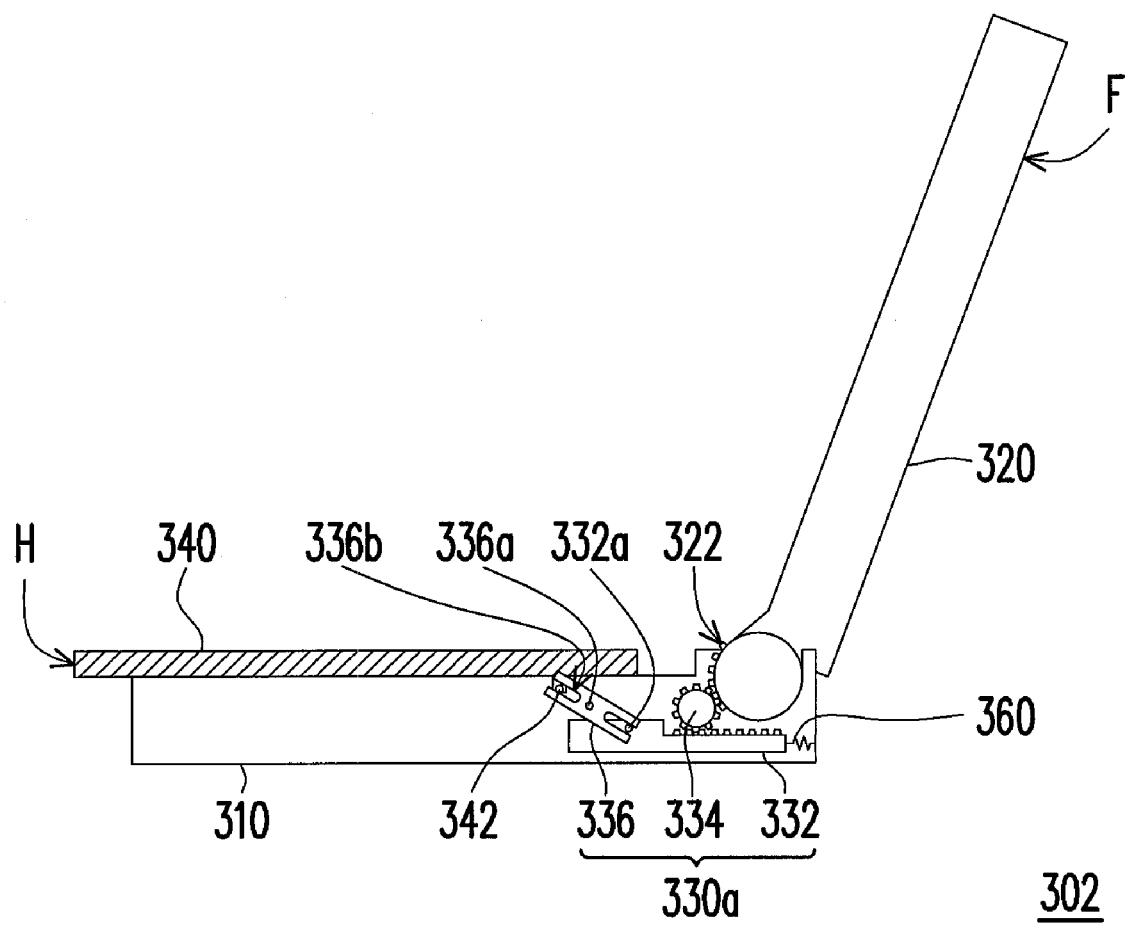
FIG. 4C is a diagram of an expanded electronic device according to another embodiment of the present invention.

FIG. 4C is a diagram of an expanded electronic device according to another embodiment of the present invention. Referring to FIG. 4C, the elastic component 360 connects the first rack 332 and the first body 310. When the electronic device 302 is expanded, the second body 320 rotates from the first position (as the first position E in FIG. 4A) to the second position F and accordingly brings the first rack 332 along to press the elastic component 360 to come to a forced state.

Figure 5A:
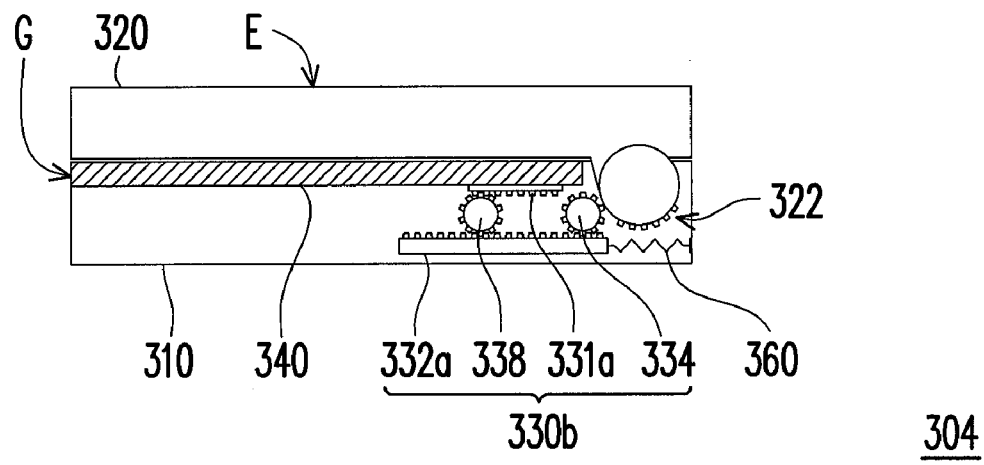
FIG. 5A is a diagram of an electronic device according to an embodiment of the present invention.
Figure 5B:
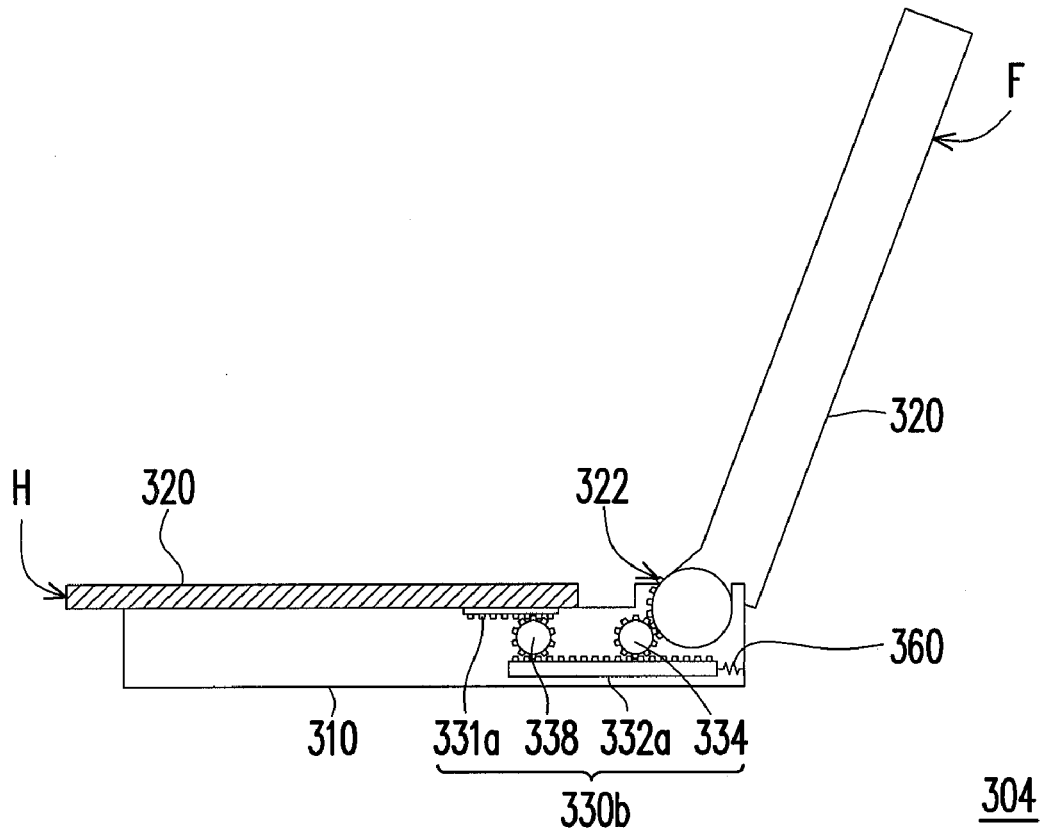
FIG. 5B is a diagram of the electronic device in FIG. 5A when the electronic device is expanded.

FIG. 5A is a diagram of an electronic device according to an embodiment of the present invention. FIG. 5B is a diagram of the electronic device in FIG. 5A when the electronic device is expanded. Referring to both FIG. 5A and FIG. 5B, the difference between the present embodiment and the embodiment described above is that in the present embodiment, the connecting mechanism 330b has a second gear 338, a first rack 332a, and a second rack 331a instead of the connecting member 336 as shown in FIG. 4A. The second rack 331a is fastened to the input unit 340, and the second gear 338 is joggled between the first rack 332a and the second rack 331a.

When the second body 320 rotates from the first position E to the second position F, the second body 320 drives the connecting mechanism 330b through the gear structure 322 and accordingly drives the input unit 340 to move from the third position G to the fourth position H sequentially through the first gear 334, the first rack 332a, the second gear 338, and the second rack 331a. Contrarily, when the second body 320 rotates from the second position F back to the first position E, the second body 320 also drives the input unit 340 to move from the fourth position H back to the third position G through the gear structure 322 and the connecting mechanism 330b.

Moreover, in the present embodiment, the electronic device 300 further includes an elastic component 360 which disposed on the first body 310 and connects the first rack 332a and the first body 310. When the electronic device 304 is expanded, the second body 320 rotates from the first position E to the second position F and accordingly brings the first rack 332a along to press the elastic component 360 to come to a forced state. Contrarily, when the elastic component 360 is released from the pressed state, the connecting mechanism 330b and the gear structure 322 are driven by the elastic component 360 so that the electronic device 304 is closed.

Figure 5C:
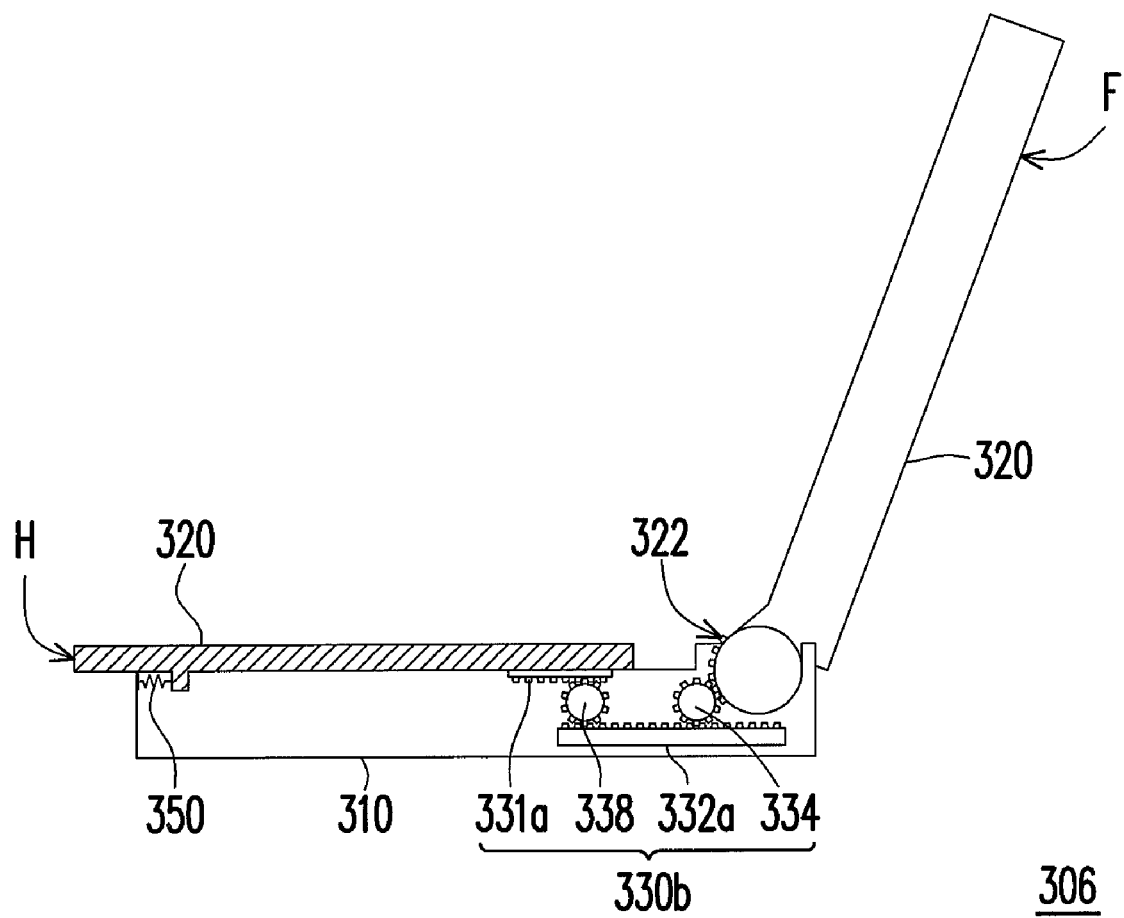
FIG. 5C is a diagram of an expanded electronic device according to another embodiment of the present invention.

FIG. 5C is a diagram of an expanded electronic device according to another embodiment of the present invention. Referring to FIG. 5C, the elastic component 350 connects the input unit 340 and the first body 310. When the electronic device 306 is expanded, the input unit 340 moves from the third position (as the third position G in FIG. 5A) to the fourth position H so that the elastic component 350 is pressed by the input unit 340 and in a forced state.

As described above, the present invention provides an electronic device having a movable input unit. When the electronic device is expanded, the input unit is moved through a connecting mechanism. Thus, when an upper body is moved, the input unit is moved out of a covered area so that the input unit is completely exposed by the upper body. The electronic device in the present invention offers a larger spare for the design of the input unit. For example, additional function keys can be added to the input unit.

On the other hand, according to the present invention, because the input unit offers a larger operation area exposed by the upper body, the keys of the input unit can be enlarged so that a user can operate the electronic device conveniently. In overview, the electronic device in the present invention is practical and convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
a first body;
a second body, slidably disposed on the first body;
a connecting mechanism, disposed in the first body; and
an input unit, slidably disposed on the first body, wherein
the connecting mechanism connects the input unit and the second body, and when the second body slides from a first position to a second position relative to the first body, the second body drives the input unit to slide from a third position to a fourth position relative to the first body through the connecting mechanism.

2. The electronic device according to claim 1, wherein the connecting mechanism comprises:
a blocking portion, movably disposed in the first body, and protruded from the first body towards the second body; and
at least one connecting member, connected between the blocking portion and the input unit, wherein when the second body moves from the first position to the second position relative to the first body, the second body interferes with the blocking portion and accordingly brings the connecting member along so that the connecting member drives the input unit to move from the third position to the fourth position relative to the first body.

3. The electronic device according to claim 2, wherein the connecting member has a pivotal portion and two guide grooves located at two opposite sides of the pivotal portion, the blocking portion and the input unit respectively have a convex cylinder, the connecting member is pivoted on the first body through the pivotal portion, and the convex cylinders are movably disposed in the guide grooves.

4. The electronic device according to claim 2, wherein the connecting member comprises a gear and two racks, wherein the racks are respectively fastened to the input unit and the blocking portion, and the gear is joggled between the racks.

5. The electronic device according to claim 2 further comprising an elastic component for connecting the blocking portion and the first body, wherein the elastic component is forced when the second body is at the second position.

6. The electronic device according to claim 1 further comprising an elastic component for connecting the input unit and the first body, wherein the elastic component is forced when the second body is at the second position.

7. The electronic device according to claim 1, wherein the second body substantially covers the input unit when the second body is at the first position and the input unit is at the third position.

8. The electronic device according to claim 1, wherein the input unit comprises a keypad, a keyboard, a capacitive touch-sensing keyboard, a resistive touch-sensing keyboard, or a touch-sensing display which displays a keyboard on the screen.

9. An electronic device, comprising:
a first body;
a second body, pivoted on the first body;
a connecting mechanism, disposed in the first body; and
an input unit, movably disposed on the first body, wherein a gear structure is disposed at where the second body is connected to the connecting mechanism, the connecting mechanism comprising:
a first rack, movably disposed in the first body;
a first gear, joggled between the gear structure and the first rack; and
at least one connecting component, connected between the input unit and the first rack,
wherein the connecting mechanism connects the input unit and the second body, and when the second body rotates from a first position to a second position relative to the first body, the second body drives the first rack, the first gear, and the at least one connecting component through the connecting mechanism, so as to drive the input unit to move from a third position to a fourth position relative to the first body.

10. The electronic device according to claim 9, wherein the connecting member has a pivotal portion and two guide grooves located at two opposite sides of the pivotal portion, the first rack and the input unit respectively have a convex cylinder, the connecting member is pivoted on the first body through the pivotal portion, and the convex cylinders are movably disposed in the guide grooves.

11. The electronic device according to claim 9, wherein the connecting member comprises a second gear and a second rack, wherein the second rack is fastened to the input unit, and the second gear is joggled between the first rack and the second rack.

12. The electronic device according to claim 9 further comprising an elastic component for connecting the first rack and the first body, wherein the elastic component is forced when the second body is at the second position.

13. The electronic device according to claim 9 further comprising an elastic component for connecting the input unit and the first body, wherein the elastic component is forced when the second body is at the second position.

14. The electronic device according to claim 9, wherein the second body substantially covers the input unit when the second body is at the first position and the input unit is at the third position.

15. The electronic device according to claim 9, wherein the input unit comprises a keypad, a keyboard, a capacitive touch-sensing keyboard, a resistive touch-sensing keyboard, or a touch-sensing display which displays a keyboard on the screen.

* * * * *